(12) United States Patent
Paquet

(10) Patent No.: US 8,538,736 B1
(45) Date of Patent: Sep. 17, 2013

(54) SYSTEM AND METHOD FOR SIMULATING OBJECT WEIGHT IN ANIMATIONS

(75) Inventor: Philippe Paquet, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 364 days.

(21) Appl. No.: 12/955,685

(22) Filed: Nov. 29, 2010

(51) Int. Cl.
G06G 7/48 (2006.01)

(52) U.S. Cl.
USPC .............................................. 703/6; 345/473

(58) Field of Classification Search
USPC ............................................................. 703/6
See application file for complete search history.

(56) References Cited

U.S. PATENT DOCUMENTS

| | | | |
|---|---|---|---|
| 7,409,322 B2 * | 8/2008 | Ng-Thow-Hing | 703/1 |
| 7,573,477 B2 * | 8/2009 | Ng-Thow-Hing | 345/473 |
| 2010/0030532 A1 * | 2/2010 | Arora et al. | 703/2 |
| 2011/0267356 A1 * | 11/2011 | Rennuit | 345/473 |

OTHER PUBLICATIONS

AnyBody Technology, "The AnyBody Modeling System", Tutorials, Version 3.0.0, Sep. 2007.*
Reed et al, "An Integrated Model of Gait and Transition Stepping for Simulation of Industrial Workcell Tasks", SAE Technical Paper Series, 2007-01-2478, Digital Human Modeling for Design and Engineering Conference and Exhibition, Jun. 12-14, 2007.*
Bhatt et al, "Dynamic Optimization of Human Stair-Climbing Motion", SAE International 2008-01-1931, 2008.*
Kim et al, "Digital Human Modeling and Virtual Reality for FCS, Dynamic Motion Prediction of Gait and Lifting", Technical Report No. VSR-04.02, Oct. 25, 2004.*
Abe et al, "Interactive Animation of Dynamic Manipulation", Massachusetts Institute of Technology, Feb. 28, 2006.*

* cited by examiner

Primary Examiner — Mary C Jacob
(74) Attorney, Agent, or Firm — Patterson & Sheridan LLP

(57) ABSTRACT

A system and method simulating object weight for computer-generated animation uses inverse kinematics for simulating object weight to generate new positions of an object being carried by an animated character. An object is assigned a weight and the object is attached to the animated character at one or more attachment points. A weight varying function is used to increase the weight when the character's foot contacts the terrain surface during a "step" and the increase is reduced between each step. A distance between the attachment point(s) and the terrain surface is reduced by a number of inches per pound when inverse kinematics is applied to generate new positions of the attachment point(s).

14 Claims, 6 Drawing Sheets

SYSTEM AND METHOD FOR SIMULATING OBJECT WEIGHT IN ANIMATIONS

BACKGROUND

1. Field of the Invention

The present invention relates to the field of computer generated animation and, in particular, to a system and method for simulating object weight when generating motion of an animated character.

2. Description of the Related Art

Users of game systems have come to expect increasing complexity in gameplay and increasing complexity in graphics associated with such gameplay. In many games, the visual impact on the user is as important as any other aspect of the game, creating interest in the user and aiding in explanation of the plot. Increased graphic complexity and realism additionally allows more detailed interactions within the game. The increased expectations of users of game systems for improved realism in game graphics have also increased the burden placed on animators to generate characters that are visually stimulating and to include details that were previously impossible to animate in a gameplay environment.

In addition, users demand that characters and objects move in a physically accurate manner and that interactions within the game are believable. In a conventional system, when a character carries an object, such as a weapon, the object usually appears to be weightless.

As the foregoing illustrates, there is a need in the art for an improved technique for simulating the weight of an object in an animation.

SUMMARY

Embodiments of the invention include a system for simulating object weight when generating motion of an animated character. An object is assigned a weight and the object is attached to the animated character at one or more attachment points. A weight varying function is used to increase the weight when the character's foot contacts the terrain surface during a "step" and the increase is reduced between each step. A distance between the attachment point(s) and the terrain surface is reduced as a result of the object weight when inverse kinematics is applied to generate the motion of the character. The object's weight is distributed between multiple attachment points according to the distance between each attachment point and the center of gravity of the object. Additionally, a noise function may be applied to adjust the weight by small amounts in order to produce more realistic effect at the attachment point.

One embodiment of the invention provides a computer-implemented method for simulating object weight using inverse kinematics. The method includes receiving a position of a first attachment point on a character in the animation and a weight of an object that is connected to the character at the first attachment point. A new position of the first attachment point on the character in the animation is computed, using inverse kinematics, based on applying the weight of the object at the first attachment point.

One advantage of the techniques described herein is that updated positions of attachment points on a character may be generated to produce animations when the character carries different objects, each object having a different weight. Character parameters may be defined and used to generate character motion for the different objects, where the object's weight is applied through inverse kinematics to produce the updated positions of the attachment points.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention include a system for simulating object weight when generating motion of an animated character. An object is assigned a weight and the object is attached to the animated character at one or more attachment points. A weight varying function is used to increase the weight when the character's foot contacts the terrain surface during a "step" and the increase is reduced between each step. A distance between the attachment point(s) and the terrain surface is reduced as a result of the object weight when inverse kinematics is applied to generate the motion of the character. The object's weight is distributed between multiple attachment points according to the distance between each attachment point and the center of gravity of the object. Additionally, a noise function may be applied to adjust the weight by small amounts in order to produce more realistic effect at the attachment point.

One embodiment of the invention provides a computer-implemented method for simulating object weight using inverse kinematics. The method includes receiving a position of a first attachment point on a character in the animation and a weight of an object that is connected to the character at the first attachment point. A new position of the first attachment point on the character in the animation is computed, using inverse kinematics, based on applying the weight of the object at the first attachment point.

Figure 1A:
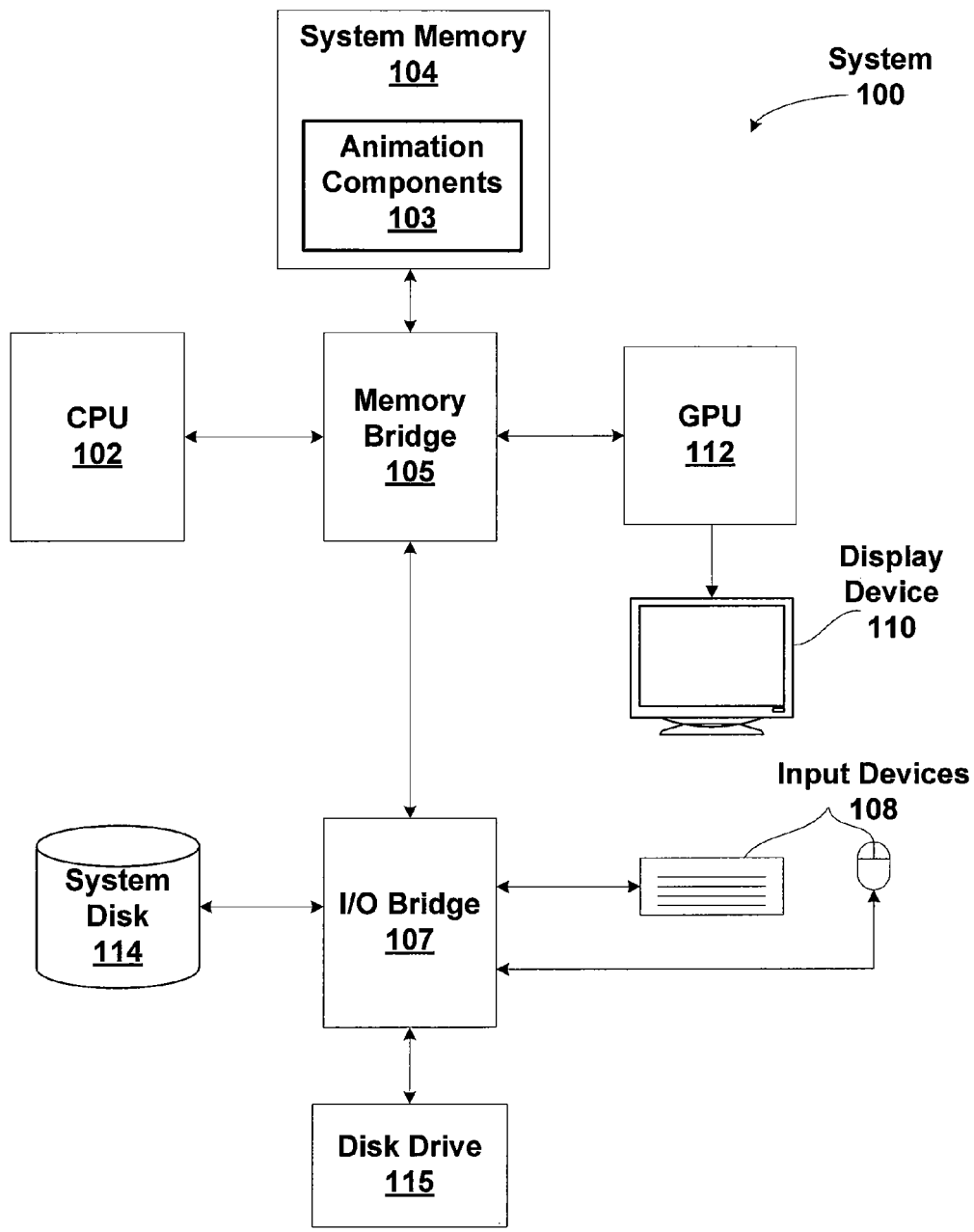
FIG. 1A is a block diagram of a system configured to implement one or more aspects of the present invention.

FIG. 1A is a diagram illustrating an example system 100 for animation generation and/or animation playback. The system 100 may be configured to generate game content, such as animation sequences. The system 100 may also be configured to execute a game and to generate animations during execution of the game. The system 100 is further configured to accept and process input from a user and to provide data for displaying the results of such user input.

The user inputs commands using input devices 108. The input devices 108 may be any device that allows the user to interact with the system 100. For example, the input device 108 may comprise a keyboard, a joystick, a controller, a microphone, a camera, a keypad, or a series of buttons, among other devices and features. The system 100 outputs graphics and animations to a display device 110, the display device 110 may be any device that receives data for display and presents it visually to the user. For example, the display device 110 may include a cathode ray tube, a plurality of light emitting diodes (LEDs), a liquid crystal display (LCD), a portable video game console, or a projector, among other devices and features.

The system 100 includes a central processing unit (CPU) 102 that is in communication with the input devices 108 through an input/output (I/O) bridge 107. The CPU 102 communicates with a graphics processing unit (GPU) 112 through a memory bridge 105 to generate images that are output to the display device 110. In some embodiments, one or more of the GPU 112, CPU 102, I/O bridge 107, and memory bridge 105 are integrated into a single device. The system 100 may further include a system memory 104 in communication with the CPU 102 through the memory bridge 105. The system memory 104 may comprise certain types of random access memory (RAM) such as dynamic random access memory (DRAM) or static random access memory (SRAM), or may comprise any other type of volatile memory. The volatile memory 104 may be used to store data and/or instructions during operation of the CPU 102. In particular, the system memory 104 may store animation components 103 that are used to generate the animations based on user inputs during gameplay and game content that is played back during gameplay. Those skilled in the art will recognize other types of volatile memory and uses thereof.

The system 100 may further include a non-volatile system disk 114 that is in communication with the CPU 102 through the I/O bridge 107 and memory bridge 105. The system disk 114 may include flash memory, magnetic storage devices, hard disks, or read-only memory (ROM) such as erasable programmable read-only memory (EPROM), or any other type of non-volatile memory. The system disk 114 may be used to store games, instructions, character information, game status information, or any other information that is to be retained if power to the system 100 is removed. The system 100 may comprise an interface to install or temporarily locate additional non-volatile memory. Those skilled in the art will recognize other types of non-volatile memory and uses thereof.

The GPU 112 is configured to render data supplied by the CPU 102 for display on the display device 110. The GPU 112 may be configured to perform any number of functions related to providing data for display on the display device 110. For example, the GPU 112 may be configured to render a plurality of polygons, apply shading or texture, create data representative of a three-dimensional environment, or convert between coordinate spaces, among other functions. Those skilled in the art will recognize other configurations and functionalities of the GPU 110.

The system 100 may further include a disc drive 115 in communication with the CPU 102. The CPU 102 may read data from a disc inserted into the disc drive 115. In some embodiments, the system 100 is configured to record data on the disc using the disc drive 115. In this way, data relating to gameplay and animation may be transported to or from the system 100. For example, many games are sold on compact discs (CDs) or digital versatile discs (DVDs). A majority of these games are produced such that all information needed to play the game, including character, plot, and animation data, are included on the disc. Thus, a user may purchase a disc containing a game for execution on the system 100. A game may also be stored on the system disk 114.

The system 100 is not limited to the devices, configurations, and functionalities described above. For example, although a single volatile memory 106, non-volatile memory 108, GPU 110, disc drive 112, input device 114, and display device 116 are illustrated, a plurality of any of these devices may be implemented internal or external to the system 100. In addition, the system 100 may comprise a power supply or a network access device. Those skilled in the art will recognize other such configurations of the system 100. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

The components described herein may be implemented in a variety of systems and devices. For example, the system 100 may comprise a console designed for execution of games, such as an arcade machine, a SONY PLAYSTATION 3, or a MICROSOFT XBOX 360. The system 100 may also comprise a general computing device configured for execution of games, such as a laptop, desktop, or personal computer.

Graphics and animations for display by the system 100 can be created using any number of methods and devices. Modeling software, such as MAYA, sold by AUTODESK, is often used, especially when generating graphics and animations representing a three dimensional environment. Using such software, an animator can create objects and motions for the objects that can be used by the game engine of the system 100 to provide data for display on the display device 110.

Figure 1B:
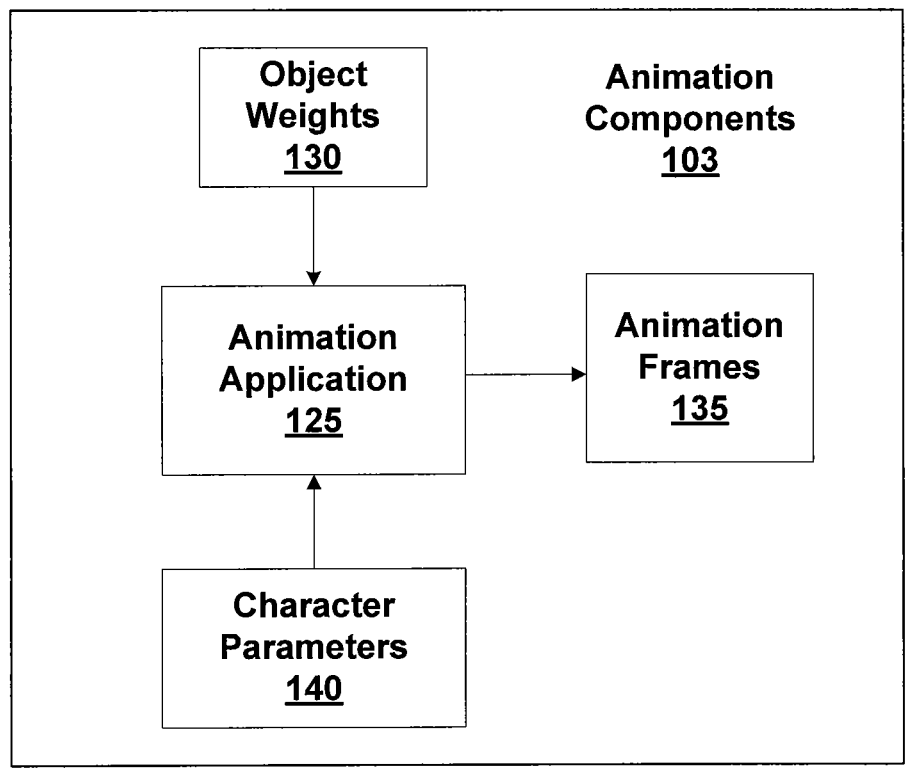
FIG. 1B is a conceptual diagram of the animation program and inputs to the animation program configured to implement one or more aspects of the present invention.

FIG. 1B is a conceptual diagram of the animation components 103 that are configured to implement one or more aspects of the present invention. Animation components 103 are stored in the system memory 104 of the system 100. The animation components 103 comprises an animation application 125 including instructions or data that can be used to generate animation. Inputs to the animation application 125 may include object weights 130 and character parameters 140. When the animation application is executed by the CPU 102 and/or GPU 112, animation frames 135 are generated and stored in the system memory 104 or dedicated graphics memory associated with the GPU 112.

The animation application 125 may be a game engine that provides graphics and animations associated with a scene or moment in the game. These graphics and animations are displayed on the display device 110. When a user inputs a command using the input devices 108, the animation application 125 evaluates the command and determines the effect of the command on the execution of the game. These effect may be reflected in the graphics and animations displayed to the user. For example, a user may press a button to cause a character to pick up an object in a scene. The object weight is received by the animation application 125 from the object weights 130 and the parameters specific to the character are received from the character parameters 140. For example, character parameters may include one or more attachment points at which the object is connected or coupled to the character. Other character-specific parameters may include a function that is used to apply the weight when inverse kinematics are used to compute a position of the object or an attachment point that is connected to the object and a distance per weight unit value that is used as an input to perform inverse kinematics. Another example of a character-specific parameter is a motion path of a character, where specific points along a path may be defined for each attachment point and other points of interest on the character (feet, hands, elbows, and the like) in addition to a root path corresponding to a center-point of the character.

Inverse kinematics refers to a technique for determining the positions and orientations of elements based on a desired final position and orientation. Instead of receiving adjustments to each element, as would a forward kinematics solver, an inverse kinematics solver receives procedural input and determines the adjustments that satisfy that procedural input. In terms of an object that is attached to a character, an inverse kinematics solver receives a final position of the attachment point(s), which also define the position of the object, and thereafter determine the positions, orientations, and movements of the attachment point(s) and connected elements that cause the attachment point(s) to reach to the final position(s). As previously explained, in a conventional system, an object, such as a weapon, appears to be weightless. When an object weight is provided and inverse kinematics is used to compute new positions of attachment points on the character, the object weight influences the elements of the character, thereby generating a more realistic animation. Additionally, the character parameters 140 are defined to enable the generation of animations of the same character including different objects, each having a different weight.

Figure 2A:
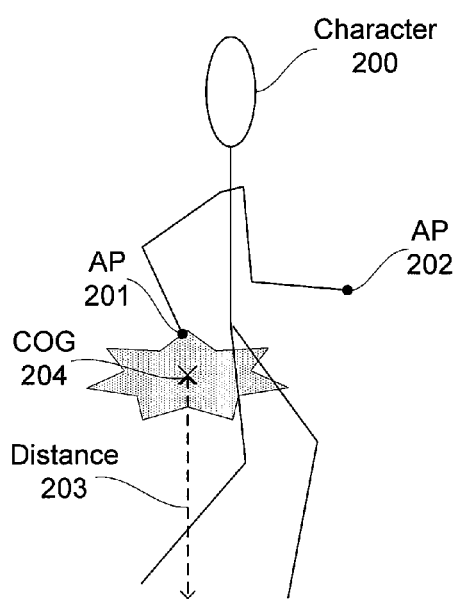
FIG. 2A is a diagram illustrating a character carrying an object, according to one embodiment of the invention.

FIG. 2A is a diagram illustrating a character 200 carrying an object, according to one embodiment of the invention. Although the character 200 depicted is a human, other characters, such as animals and humanoid creatures may be configured to carry or otherwise be attached to an object. At least two attachment points, attachment point (AP) 201 and AP 202 are specified for the character 200. A center-of-gravity (COG) 204 is computed for the object. When the object has a first weight value, a distance 203 between the AP 201 and the terrain surface is determined and the positions of the AP 201 are computed using inverse kinematics. The new positions of the AP 201 over time influences the positions and orientations of elements (e.g., arm, shoulder, legs, and the like) of the character 200.

Figure 2B:
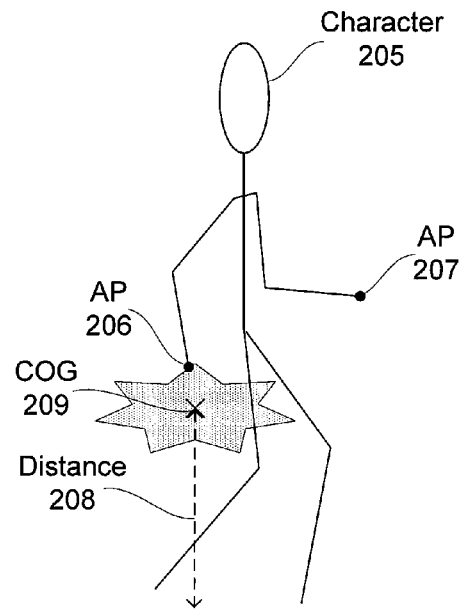
FIG. 2B is a diagram illustrating the character carrying on object of increased weight, according to one embodiment of the invention.

FIG. 2B is a diagram illustrating the character 205 carrying an object of increased weight, according to one embodiment of the invention. At least two attachment points, AP 206 and AP 207 are specified for the character 205. A COG 209 is computed for the object. When the object has a second weight value that is greater than the first weight value, a distance 208 between the AP 206 and the terrain surface is determined and the positions and orientations of elements (e.g., arm, shoulder, legs, and the like) of the character are computed using inverse kinematics. The distance 208 is less than the distance 203 since the weight of the object is increased. Alternatively, the distance per weight unit value parameter defined for the character 205 may be increased to achieve the same effect of decreasing the distance between the object and the terrain surface.

Figure 2C:
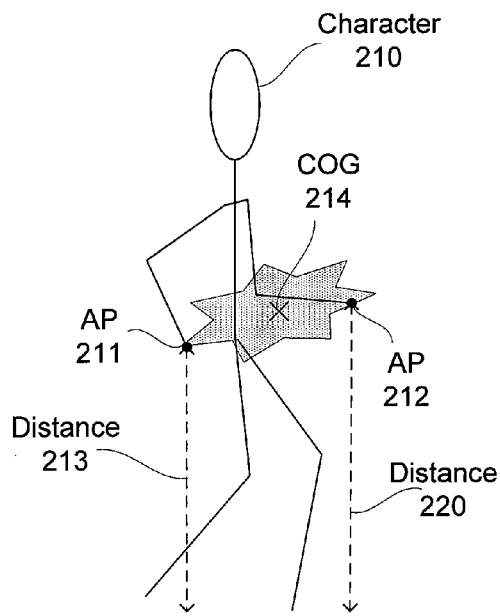
FIG. 2C is a diagram illustrating another character carrying an object, according to one embodiment of the invention.

FIG. 2C is a diagram illustrating a character 210 carrying an object, according to one embodiment of the invention. At least two attachment points, AP 211 and AP 212 are specified for the character 210. A center-of-gravity (COG) 214 is computed for the object. The weight is distributed between the two attachment points since the character 210 is controlled to carry the object using two hands. The portion of the object's weight distributed to AP 211 and AP 212 is based on the distance between AP 211 and COG 214 and the distance between AP 212 and COG 214, respectively. A distance 213 between the AP 211 and the terrain surface is determined and a distance 220 between the AP 212 and the terrain surface is also determined that is based on the portions of the object's weight distributed to each of the attachment points. The positions and orientations of elements (e.g., arm, shoulder, legs, and the like) of the character are computed using inverse kinematics to position AP 212 and AP 211 at the distances 220 and 213, respectively.

Figure 2D:
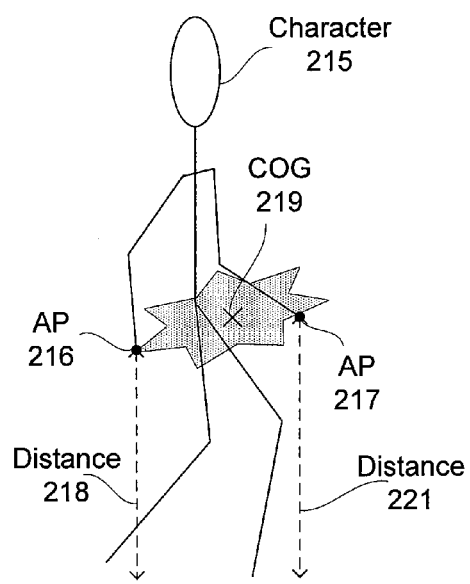
FIG. 2D is a diagram illustrating the character carrying on object of increased weight, according to one embodiment of the invention.

FIG. 2D is a diagram illustrating a character 215 carrying on object of increased weight compared with the object described in conjunction with FIG. 2C, according to one embodiment of the invention. At least two attachment points, AP 216 and AP 217 are specified for the character 215. A COG 219 is computed for the object. The increased weight is distributed between the two attachment points since the character 215 is controlled to carry the object using two hands. The portion of the object's increased weight distributed to AP 216 and AP 212 is based on the distance between AP 211 and COG 214 and the distance between AP 217 and COG 219, respectively. A distance 218 between the AP 216 and the terrain surface is determined and a distance 221 between the AP 217 and the terrain surface is also determined based on the portions of the object's increased weight that is distributed to each of the attachment points. The positions and orientations of elements (e.g., arm, shoulder, legs, and the like) of the character 215 are computed using inverse kinematics to position AP 217 and AP 216 at the distances 221 and 218, respectively. The distances 218 and 221 are less than the distances 213 and 220, respectively, since the weight is increased. Alternatively, the distance per weight unit value parameter defined for the character 205 may be increased to achieve the same effect of decreasing the distance between the object and the terrain surface.

The weight of an object may vary according to a function that is used to apply the weight when inverse kinematics is used. For example, when a character steps and the foot contacts the terrain surface, the weight is increased to move the attachment point closer to the terrain surface. The function may be used to reduce the weight after the increase so that the effect of the weight decays over time until the character steps again. More specifically, a particular function may increase the weight by 10% so that 110% of the weight is applied when the step occurs, and the particular function may reduce the increased weight by 1% for each subsequent frame until the weight applied is 100%.

A weight varying function may be used to vary the weight based on a parameter corresponding to the character. A parameter may specify changes in direction of the attachment point relative to the terrain surface or gravitational force. Other examples of parameters include the motion path of the character or attachment points that defines positions over time. Parameters related to the motion path include velocity, acceleration, curvature, and the like for the attachment points of the character. In one embodiment, the weight varying function receives the parameter that defines the vertical velocity of the character as an input in order to vary the weight based on different types of movements: stepping, running, jumping, falling, and the like. The weight varying function may use different sets of predetermined coefficients to generate realistic movement, where the set of predetermined coefficients that is used is determined based on a parameter corresponding to the character, such as an order of magnitude of the vertical velocity of the character.

Figure 3A:
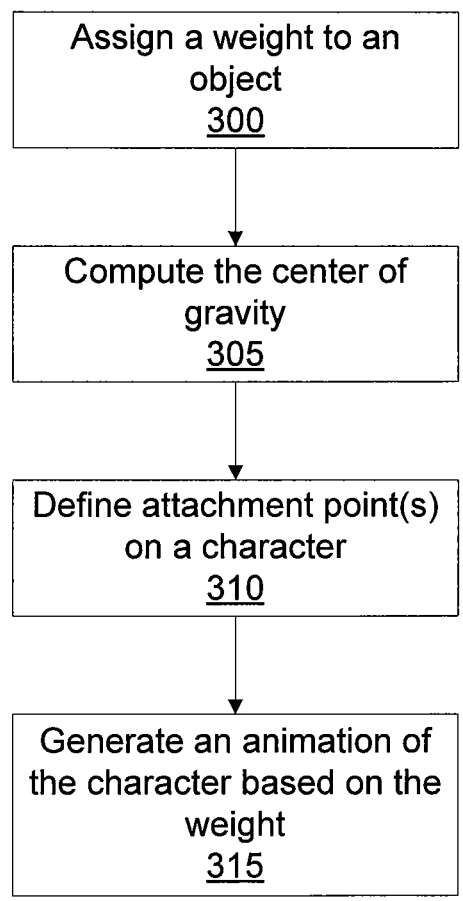
FIG. 3A is a flowchart of method steps describing the generation of the character animation based on object weight, according to one embodiment of the invention.

FIG. 3A is a flowchart of method steps describing the generation of the character animation based on object weight, according to one embodiment of the invention. Persons skilled in the art would understand that, even though the method is described in conjunction with the systems of FIGS. 1A-2D, any system configured to perform the method steps, in any order, is within the scope of embodiments of the invention.

The method begins at step 300, where a processing unit, such as the processing unit that executes the animation application 125, assigns a weight to an object and the weight is stored in the object weights 130. At step 305, the processing unit computes the center-of-gravity of the object. The center-of-gravity may also be stored in the object weights 130. At step 310, the processing unit defines one or more attachment points on a character. An attachment point may be positioned anywhere on the character. The positions of the one or more attachment points (or offsets relative to a reference point specific to the character) may be stored in the character parameters 140. In one embodiment, the attachment point positions are defined and stored when the character is created. At step 315, the processing unit generates an animation of the character motion, where the character motion is based on the weight of the object. The generation of the character motion comprises using the weight and inverse kinematics to determine new position(s) of the attachment point(s), as described in conjunction with FIG. 3B.

Figure 3B:
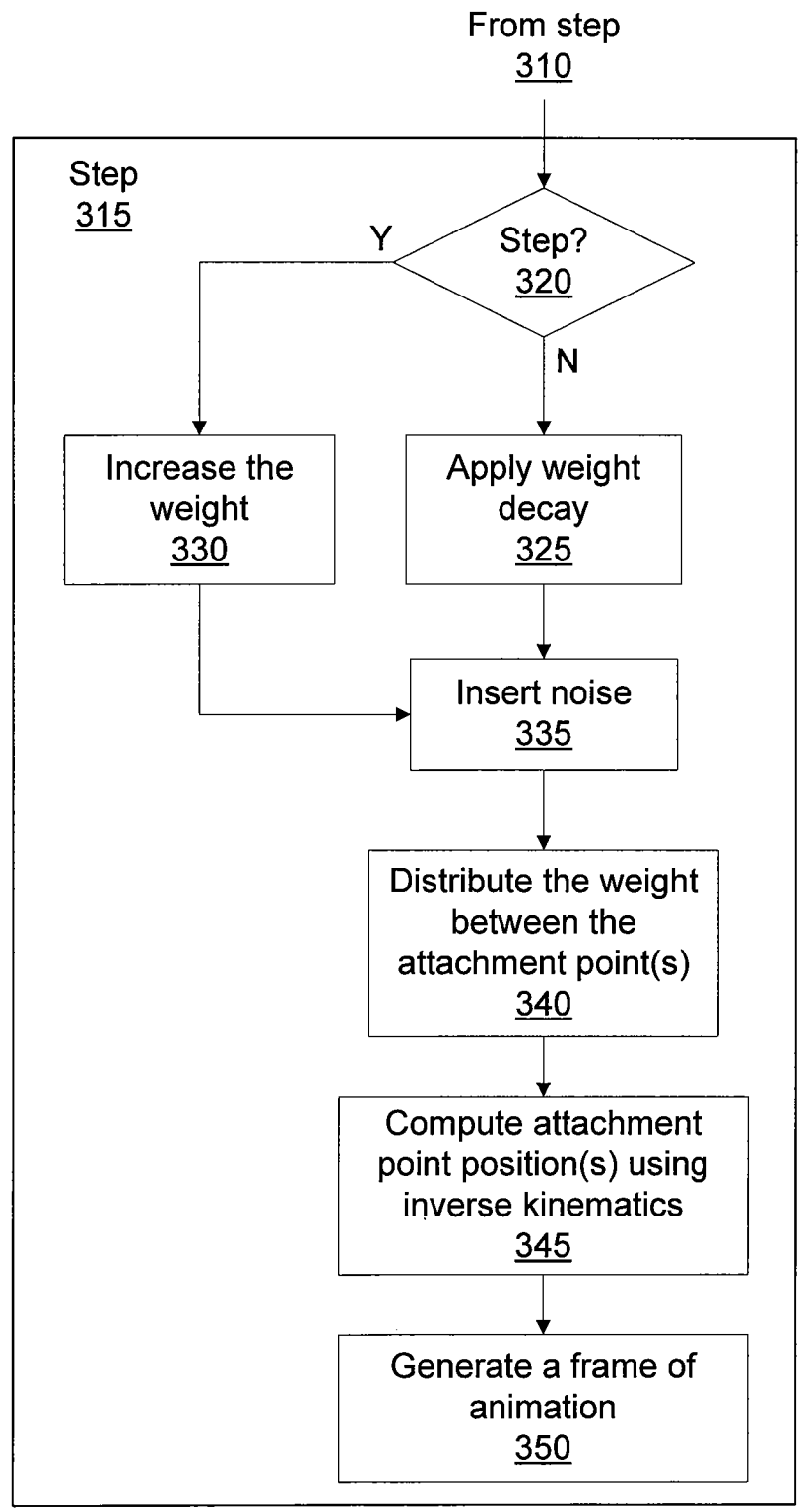
FIG. 3B is a flowchart of a method step of FIG. 3A, according to one embodiment of the invention.

FIG. 3B is a flowchart of the method step 315 shown in FIG. 3A, according to one embodiment of the invention. At step 320, the animation application 125 determines whether a step or other motion that produces a change in the direction of the attachment point relative to the terrain surface or gravitational force has occurred. The step or motion may be defined by a parameter corresponding to the character that defines a motion path of the character. If, at step 320 a step has occurred, then at step 330 the animation application 125 uses the weight varying function to increase the weight. Specifically, at step 330, the weight varying function may be reset by inputting a time=0 or frame=1 to increase the weight.

If, at step 325, a step has not occurred, then at step 325 the animation application 125 uses the weight varying function to determine the weight, effectively applying a weight decay to reduce the weight value that was increased after a step occurs. At step 335, the animation application 125 inserts noise into the weight value based on a noise function. Modification of the weight value by small amounts improves the realism of the motion of the character. In one embodiment, the noise function modifies the weight value based on the resolution of the display or playback platform so that less noise is introduced for higher resolution display or playback platform.

At step 340, the animation application 125 distributes the weight value between the attachment point(s). At step 345, the animation application 125 uses inverse kinematics to determine the new position of the object and/or attachment point(s) of the character based on the weight value. At step 350, the animation application 125 generates a frame of animation, where the character's position and/or pose are based, at least in part, on the weight of the object.

Figure 3C:
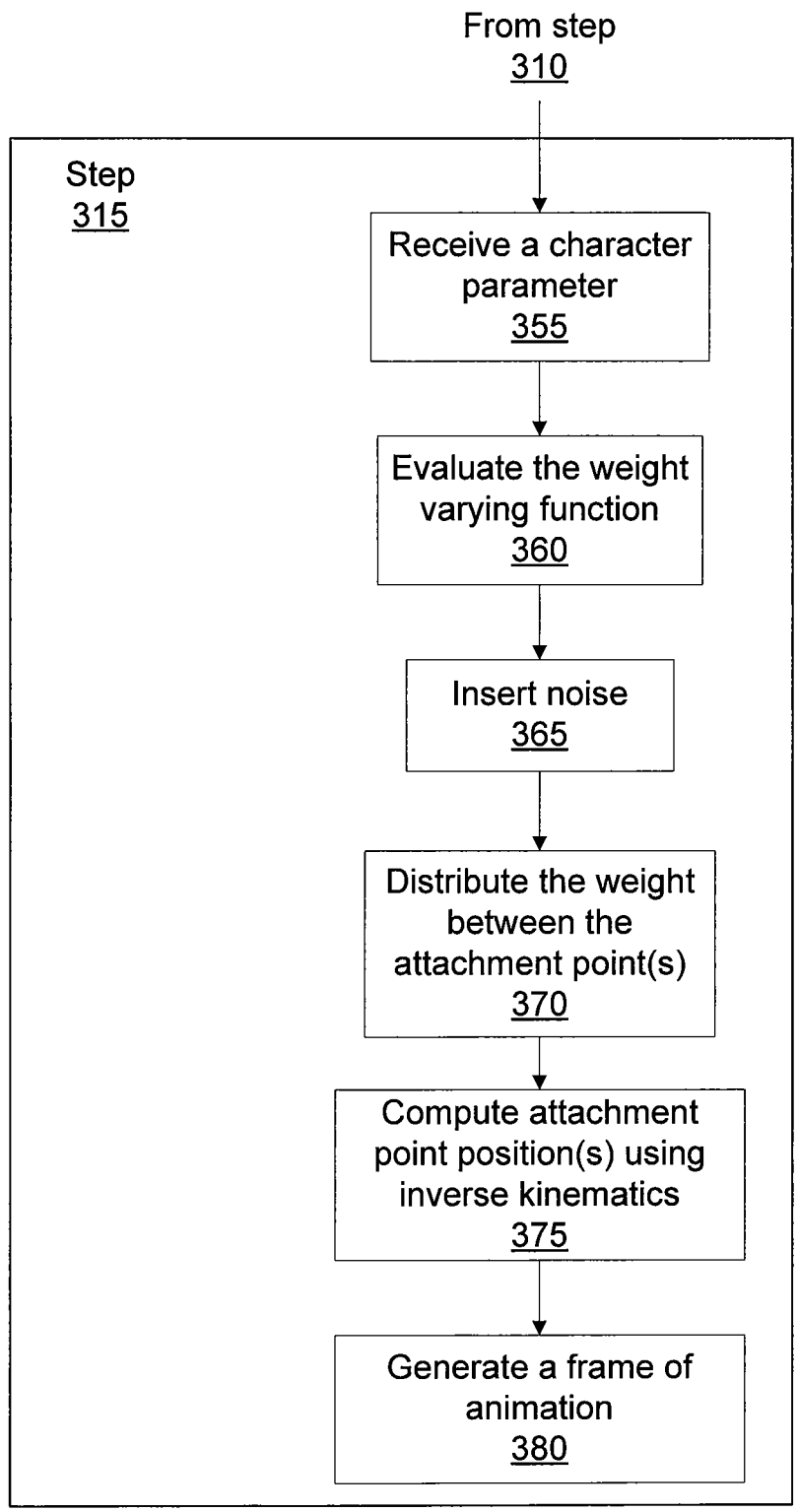
FIG. 3C is another flowchart of a method step of FIG. 3A, according to one embodiment of the invention.

FIG. 3C is another flowchart of the method step 315 shown in FIG. 3A, according to one embodiment of the invention. At step 355, the animation application 125 receives a parameter corresponding to the character. The parameter may be related to a motion path of the character, such as a vertical velocity of an attachment point or other point of interest on the character. At step 360, the animation application 125 uses the parameter as an input to the weight varying function to compute the weight of the object. As previously explained, a first set of predetermined coefficients may be selected from a plurality of sets of predetermined coefficients based on the parameter. The first set of predetermined coefficients is then used to compute the weight value.

At step 365, the animation application 125 may insert noise into the weight value based on a noise function. At step 370, the animation application 125 distributes the weight value between the attachment point(s). At step 375, the animation application 125 uses inverse kinematics to determine the new position(s) of the object and/or attachment point(s) of the character based on the weight value. At step 380, the animation application 125 generates a frame of animation, where the character's position and/or pose are based, at least in part, on the weight of the object.

The various character parameters 140 that may be specified and stored for each character include the weight varying function, sets of predetermined coefficients corresponding to a motion path (for the character's center-point, points of interest, attachment points, and the like), different vertical velocities, a distance per unit weight value (e.g., inches per pound or the like), and/or attachment point(s). Object weights 130 are specified and stored for each object. A noise function may be defined to perturb the weight based on the display platform resolution. Use of the weight value to influence the motion of the character through inverse kinematics enables the automatic generation of character animations using different objects, where the motion appears realistic. The cost and time needed to produce these character animations is advantageously reduced compared with manually generating the motion of the character for each different object.

Those skilled in the art will recognize that described systems, devices, components, methods, or algorithms may be implemented using a variety of configurations or steps. No single example described above constitutes a limiting configuration or number of steps. For example, configurations of the system 100 exist in which the described examples of components therein may be implemented as electronic hardware, computer software, or a combination of both. Illustrative examples have been described above in general terms of functionality. More or less components or steps may be implemented without deviating from the scope of this disclosure. Those skilled in the art will realize varying ways for implementing the described functionality, but such implementation should not be interpreted as a departure from the scope of this disclosure.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for simulating object weight in an animation, the method comprising:
receiving a position of a first attachment point on a character in the animation;
receiving a weight of an object that is connected to the character at the first attachment point; and
computing, using inverse kinematics, a new position of the first attachment point on the character in the animation based on the weight of the object and further based on applying a weight varying function to the weight of the object to increase or decrease the weight of the object, wherein the weight varying function receives a parameter corresponding to a motion path of the character as an input in order to vary the weight of the object based on the motion path of the character.

2. The method of claim 1, further comprising receiving a position of a second attachment point on the character in the animation, wherein the object is also connected to the character at the second attachment point.

3. The method of claim 2, further comprising distributing the weight of the object between the first attachment point and the second attachment point.

4. The method of claim 1, wherein the computing comprises applying a noise function to the weight of the object to increase and decrease the weight of the object.

5. The method of claim 4, wherein the noise function is selected based on an image resolution of a platform displaying the animation.

6. The method of claim 1, wherein the parameter is a vertical velocity of the character.

7. The method of claim 1, wherein the weight varying function uses a first set of predetermined coefficients that is selected from a plurality of sets of predetermined coefficients based on the parameter.

8. The method of claim 1, wherein the weight varying function increases the weight of the object when a change in the direction of the attachment point relative to a terrain surface occurs to produce an increased weight of the object.

9. The method of claim 1, wherein the weight varying function decreases the weight of the object over time following an increase in the weight of the object.

10. The method of claim 1, further comprising receiving a distance per unit weight value that reduces a distance between the attachment point and a terrain surface based on the weight of the object.

11. A system for simulating object weight in an animation application, the system comprising:
a memory configured to store the animation application, a weight of an object, and a character having a first attachment point; and
a processor that is coupled to the memory and configured to execute the animation application that is configured to:
receive a position of the first attachment point on the character;
receive the weight of the object that is connected to the character at the first attachment point; and
compute, using inverse kinematics, a new position of the first attachment point on the character in the animation based on the weight of the object and further based on applying a weight varying function to the weight of the object to increase or decrease the weight of the object, wherein the weight varying function receives a parameter corresponding to a motion path of the character as an input in order to vary the weight of the object based on the motion path of the character.

12. The system of claim 11, wherein the animation application is further configured to apply a noise function to the weight of the object to increase and decrease the weight of the object.

13. A non-transitory computer-readable storage medium storing instructions that, when executed by a processor, cause a computer system to simulate object weight in an animation, by performing the steps of:
receiving a position of a first attachment point on a character in the animation;
receiving a weight of an object that is connected to the character at the first attachment point; and
computing, using inverse kinematics, a new position of the first attachment point on the character in the animation based on the weight of the object and further based on applying a weight varying function to the weight of the object to increase or decrease the weight of the object, wherein the weight varying function receives a parameter corresponding to a motion path of the character as an input in order to vary the weight of the object based on the motion path of the character.

14. The computer-readable storage medium of claim 13, wherein the computing comprises applying a noise function to the weight of the object to increase and decrease the weight of the object.

* * * * *